United States Patent [19]

Thalmann et al.

[11] 4,436,987
[45] Mar. 13, 1984

[54] WELD CONNECTION FOR PLASTIC PIPE

[75] Inventors: Alfred Thalmann; Fritz Reich, both of Uhwiesen, Switzerland

[73] Assignee: Georg Fischer Aktiengesellschaft, Switzerland

[21] Appl. No.: 424,240

[22] Filed: Sep. 27, 1982

[30] Foreign Application Priority Data

Oct. 2, 1981 [CH] Switzerland .................. 6349/81

[51] Int. Cl.³ .............................. H05B 3/58
[52] U.S. Cl. ........................... 219/535; 156/304.2; 156/379.7; 156/274.2; 219/528; 219/544; 264/230
[58] Field of Search ................ 219/524–525, 219/528, 535, 541, 544; 156/253, 272, 86, 274.2, 275, 306, 304.2, 379.7, 380, 499, 583; 264/230, 272.19; 425/393, 508, 517; 385/21, 197, DIG. 20; 428/256; 138/33, 99

[56] References Cited

U.S. PATENT DOCUMENTS

| | | | |
|---|---|---|---|
| 2,307,148 | 0/0000 | McGuire | 138/99 |
| 3,519,023 | 7/1970 | Burns, Jr. et al. | 219/535 X |
| 3,907,625 | 0/0000 | Vogelsanger | 156/253 |
| 4,147,926 | 4/1979 | Stähli | 219/535 |
| 4,313,053 | 1/1982 | Sturm | 219/544 |
| 4,362,684 | 12/1982 | Thalmann | 264/230 |
| 4,365,144 | 12/1982 | Reich et al. | 219/535 |
| 4,375,591 | 3/1983 | Sturm | 219/544 |

FOREIGN PATENT DOCUMENTS

| | | |
|---|---|---|
| 556713 | 4/1957 | Belgium . |
| 8912 | 3/1980 | European Pat. Off. . |
| 350750 | of 0000 | European Pat. Off. . |
| 1479231 | 3/1969 | Fed. Rep. of Germany . |
| 2242369 | 6/1973 | Fed. Rep. of Germany . |
| 2514827 | 11/1975 | Fed. Rep. of Germany . |
| 2422896 | of 0000 | France . |
| 396536 | of 0000 | Switzerland . |
| 528697 | of 0000 | Switzerland . |
| 1409224 | of 0000 | United Kingdom . |

*Primary Examiner*—Volodymyr Y. Mayewsky
*Attorney, Agent, or Firm*—Roylance, Abrams, Berdo & Goodman

[57] ABSTRACT

An apparatus for forming a weld connection with plastic pipe comprises two molded parts and two heating mats. Each part has an internal surface corresponding to a peripheral portion of the pipe being welded such that a cavity for receiving the pipe is defined by the internal surfaces. The parts are separated by longitudinally extending clearances. Each heating mat comprises a plastic coated resistance wire, is associated with one of the molded parts and has one of its end portions in one of the clearances. The mats completely cover the internal surfaces and the pipe periphery being welded.

12 Claims, 9 Drawing Figures

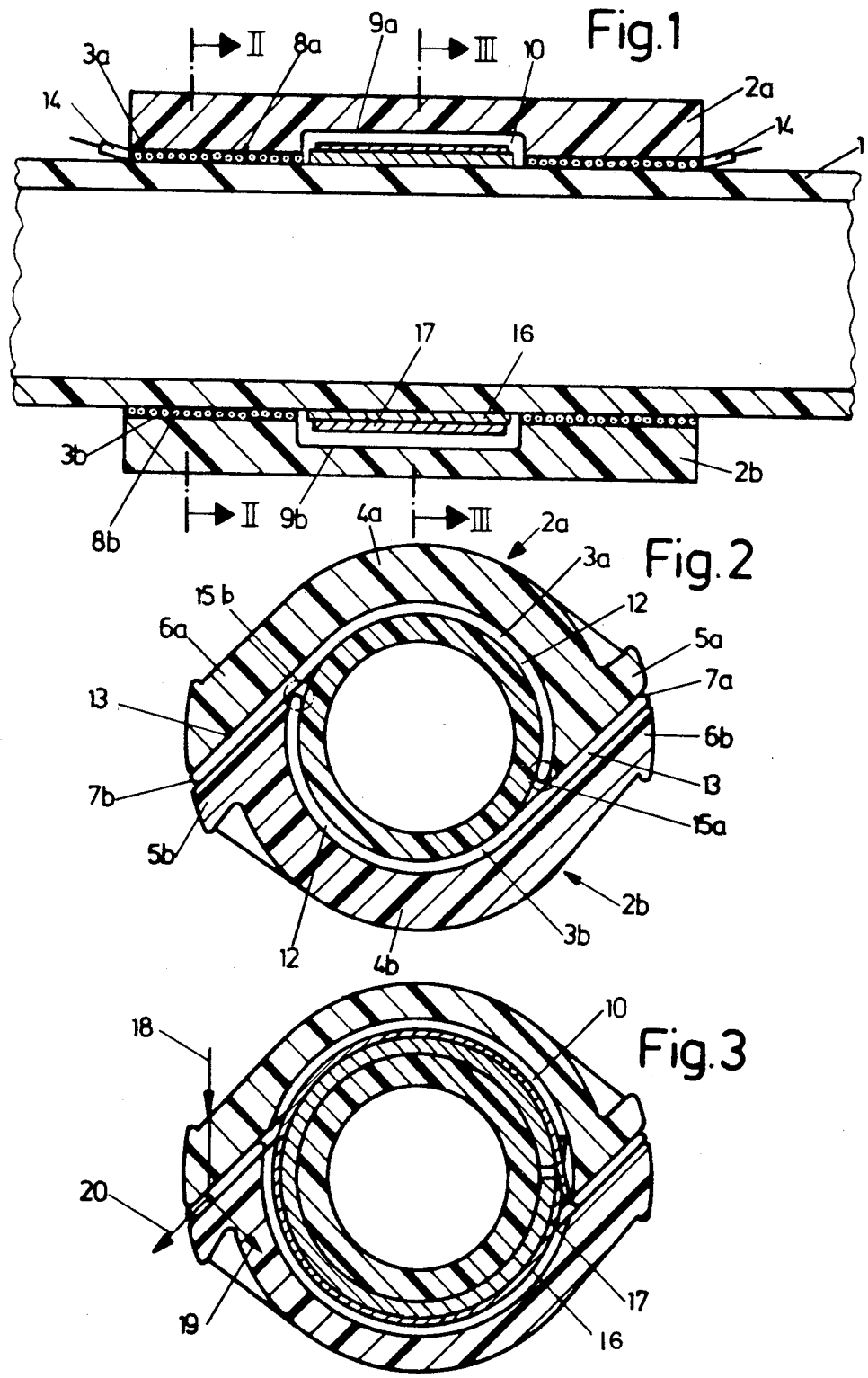

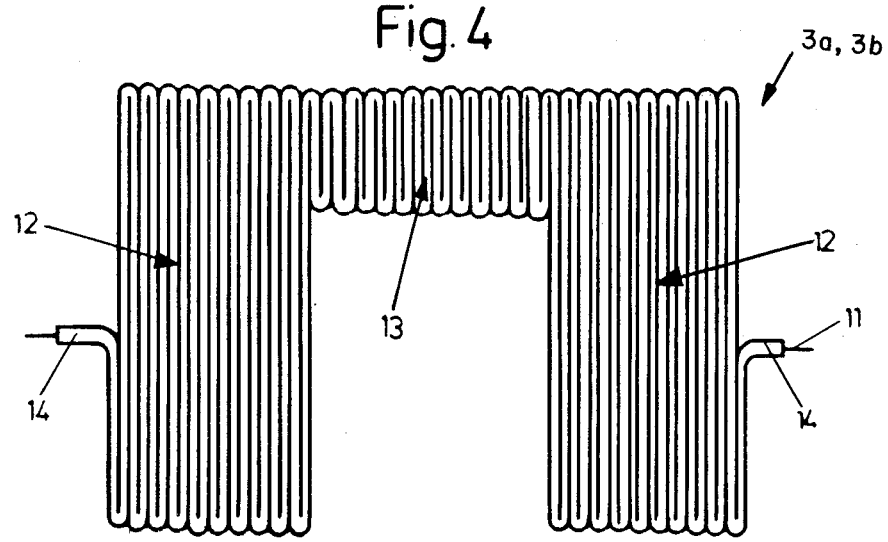
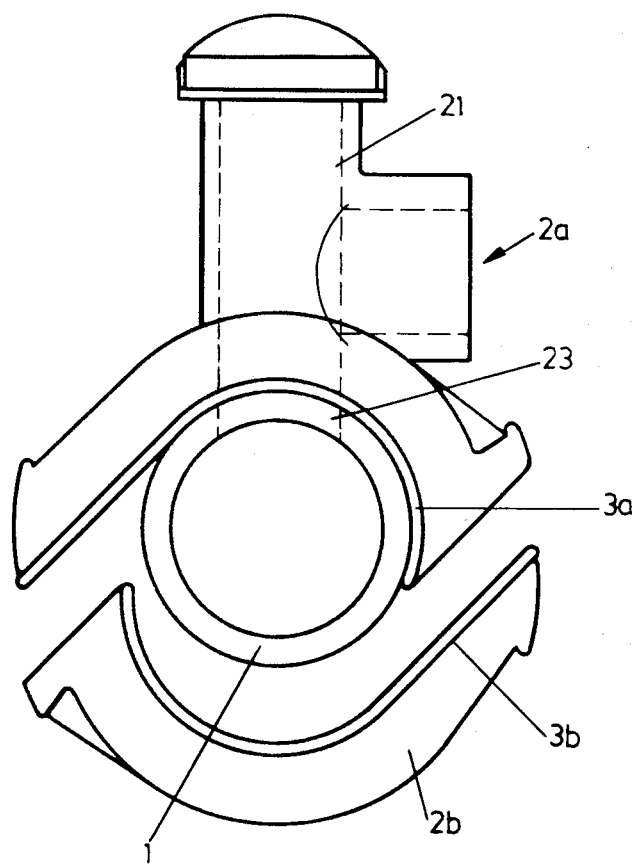

WELD CONNECTION FOR PLASTIC PIPE

The invention relates to an apparatus for forming a weld connection with thermoplastic pipe.

BACKGROUND OF THE INVENTION

The welding of two molded parts, called saddle parts, to a plastic pipe is disclosed in DE-B2-2242369, wherein a heating mat surrounds the pipe without covering it. To compensate for large deviations within the pipe diameter tolerance, particularly for larger diameter pipe, sufficiently large clearances must be provided between the mat ends and between the molded parts. Thus, complete welded connections are not guaranteed about the entire pipe periphery.

Also, no welded connection is formed with such saddle parts along both clearances so that no completely sealed weld connection is possible between one or two pipes and two molded parts. Thus, such system is limited to the welding of a saddle part provided with a branch piece with a pipe.

For connecting two pipes, it is known to use welding sleeves (e.g., CH-A 396 536). Conventional welding sleeves produce weld connections which are sealed on all sides. However, since the conventional sleeves cannot be attached radially to a previously laid pipe, the sleeves cannot be used for sealing leaky pipelines or for mounting branch lines on laid pipelines.

BRIEF DESCRIPTION OF THE INVENTION

An object of the present invention is to provide an apparatus, comprising molded parts, for forming a weld connection with plastic pipe which is completely sealed on all sides, and which can be formed on large diameter pipe and laid pipelines in situ.

Other objects, advantages and salient features of the present invention will become apparent from the following detailed description of preferred embodiments of the invention.

Briefly described, the invention includes an apparatus for forming a weld connection with plastic pipe comprising two molded parts and two heating mats. Each part has an internal surface corresponding to a peripheral portion of the pipe being welded such that a cavity for receiving the pipe is defined by the internal surfaces. The parts are separated by longitudinally extending clearances. Each heating mat comprises a plastic coated resistance wire, is associated with one of the molded parts and has one of its end portions in one of the clearances. The mats completely cover the internal surfaces and the pipe periphery being welded.

The arrangement of the heating mats in the clearances between the two molded parts with the peripheral overlap ensures that the weld connection will be completely sealed. Thus, the present invention can be easily employed to repair leaking or damaged pipelines in situ, to attach branchlines to laid pipelines in situ and to connect two pipe ends.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a side elevational view in longitudinal section of an apparatus for forming a weld connection with a plastic pipe according to a first embodiment of the present invention;

FIG. 2 is a front elevational view in section along line II—II of FIG. 1;

FIG. 3 is a front elevational view in section along line III—III of FIG 1;

FIG. 4 is a plan view of the heating mat in FIG. 1, laid flat;

FIG. 5 is a front elevational view of an apparatus for forming a weld connection with a plastic pipe according to a second embodiment of the present invention during the mounting of the bottom molded part on the pipe;

DETAILED DESCRIPTION OF THE PREFERRED EMBODIMENTS OF THE INVENTION

Figure 6:
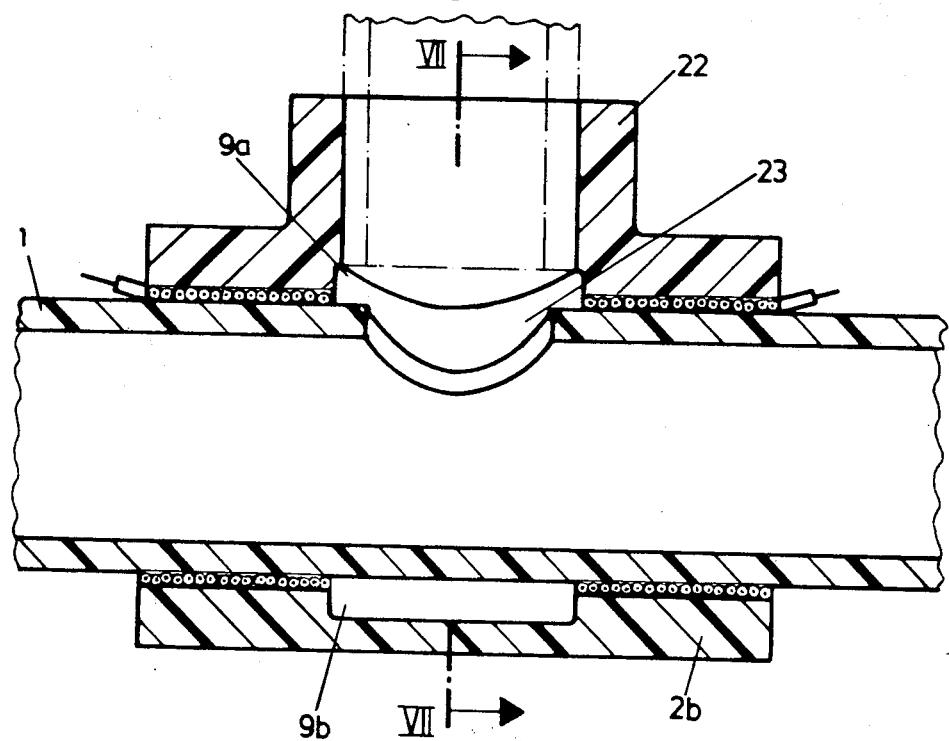
FIG. 6 is a side elevational view in longitudinal section of an apparatus for forming a weld connection to a continuous pipe according to a third embodiment of the present invention.

FIGS. 1 and 3 illustrate an apparatus for forming a weld connection used for sealing or reinforcing damaged laid pipelines in situ.

A plastic pipe 1 is welded to two molded parts 2a, 2b mounted on the pipe by two preferably identical heating mats 3a, 3b. Each mat is associated with one of the molded parts 2a or 2b. Each molded part 2a, 2b comprises an inside semicircular shell 4a, 4b and flanges 5a, 5b and 6a, 6b extending obliquely from its shell. The opposite flanges 5a and 6b or 5b and 6a each form or define a clearance 7a or 7b therebetween which extends longitudinally relative to parts 2a, 2b and to pipe 1 and which extends preferably tangentially to the internal surface of the molded parts and to the outer diameter of pipe 1. Clearances 7a, 7b could also run at an acute or right angle to the pipe diameter. Semicylindrical recesses or cutouts 9a, 9b are found on the internal surfaces of molded parts 2a, 2b, between two bearing surfaces 8a, 8b, which bearing surfaces are required for welding. Cutouts 9a, 9b, together with the outer diameter of pipe 1, form an annular chamber 10.

FIG. 4 illustrates a heating mat 3a or 3b laid flat, which comprises a zigzag-arranged heating or resistance wire 11 covered with plastic.

The heating wire 11 is wound such that each heating mat is U-shaped with two side pieces 12 and one crosspiece 13. Both projecting ends 14 of the heating wire of each heating mat, when the connection is completed, projected out from under the molded parts and are attached by clamp or plug connections to a current source (see also FIG. 1).

The heating mats 3a, 3b are inserted between pipe 1 and molded parts 2a, 2b such that side pieces 12 lie between the outer diameter of pipe 1 and the bearing surfaces 8a or 8b of the molded parts and the crosspieces 13 lie in the clearances 7a, 7b (see FIGS. 1 and 2).

Both side pieces of both mats 3a, 3b surround pipe 1 entirely, whereby the end of side piece 12 of one heating mat 3b or 3a and crosspiece 13 in clearance 7a or 7b of the other heating mat 3a or 3b overlap at 15a or 15b. This arrangement produces two complete peripheral weld connections between the pipe and the molded parts in the area of the bearing surfaces and two continuous longitudinal weld connections between the two molded parts in clearance 7a and 7b.

For simpler assembly, each of the heating mats 3a or 3b is fastened on the relevant molded part 2a or 2b. The free ends of each side piece 12 are advantageously fastened on bearing surfaces 8a or 8b, e.g., by welding or gluing.

The two molded parts are pressed together by force applied in the direction of arrow 18, resulting in the pressing force in the direction of arrow 19, and the pressing force in the direction of arrow 20 which presses the heating mat 3a or 3b at its fastening point on its other end tightly against the pipe surface (FIG. 3). During melting of the plastic and pressing of the molded parts onto the pipe surface, the heating mats always engage the pipe and molded parts tightly such that a good and tight weld connection is formed. Thus, the outward component (in the direction of arrow 20) for the force in the direction of arrow 18 causes the molded parts to shift laterally, resulting in a decrease in the internal perimeter of the molded parts and pressure on the heating mats during the welding process to compensate for the pipe tolerances.

The flanges 5a, 6a or 5b, 6b are configured such that a force is produced in the desired direction of arrow 18 by suitably configured pliers. In addition to pliers, spanner, bands, screw clamps or similar clamping elements could be used for producing uniform welding and positioning pressure.

For repairing a leaking pipeline, e.g., for gas, the leak is initially and temporarily sealed with a packing mat 16 which is pressed with a clip 17 or a strap on pipe 1 (see FIGS. 1 and 3). A higher strength temporary seal can be produced, e.g., with woven reinforced adhesive tape. When the molded parts 2a, 2b with heating mats 3a, 3b are mounted on the pipe, the temporary seal is located in recesses 9a, 9b or annular chamber 10. This chamber is completely sealed by the subsequent welding and surrounds the portion of the pipe which is to be completely sealed. Thus, leaking pipelines can be sealed without halting or detouring the medium flowing continuously therethrough.

If the pipe is only damaged and is still sealed, the temporary seal can be omitted. The two molded parts are welded to pipe 1 to reinforce it with the damaged portion located in the area of chamber 10.

In addition to repairing laid pipelines, molded parts 2a, 2b, shown in FIGS. 1 to 3, can be used with their heating mats 3a, 3b for connecting two pipes. To shorten the length of the structure, while retaining the sleeve-like configuration of the molded parts, the cut-outs 9a, 9b are deleted, and the heating mat is rectangular.

As shown in FIG. 5, one molded part 21 can be configured to include a central bore by means of which branch lines can be attached in a known manner to laid pipelines without interrupting their operation. The second molded part 2b and both heating mats 3a, 3b correspond to the configuration shown in FIGS. 1 to 4. With the U-shaped configuration of the heating mats, the mats need not be pentrated to connect a branch line and only a bore 23, indicated with broken lines, must be made in pipe 1 by a boring tool.

Figure 7:
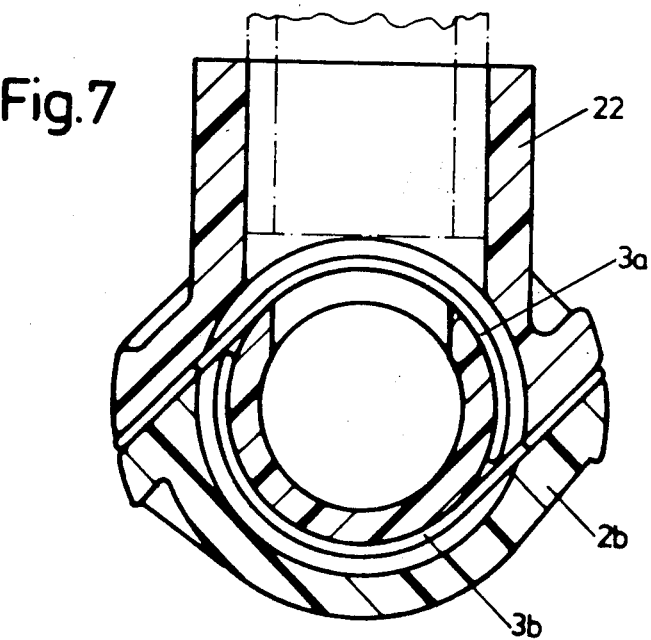
FIG. 7 is a front elevational view in section along line VII—VII of FIG. 6.

FIGS. 6 and 7 show the weld connection for a pipe 1 of a pipeline with a molded part, configured as branch piece 22. The other molded part corresponds to the molded part 2b shown in FIGS. 1 to 3. The heating mats 3a, 3b are likewise U-shaped.

With this configuration for the heating mats forming two, axially spaced peripheral welds at both ends of the molded parts, branch pieces can be provided for a branch pipe with a large diameter, corresponding to the diameter of pipe 1. The bore 23 can be formed with a suitable boring device in pressureless and pressurized pipeline. Thus, large diameter branch lines can be used with existing continuous pipelines, without cutting the pipelines.

Figure 8:
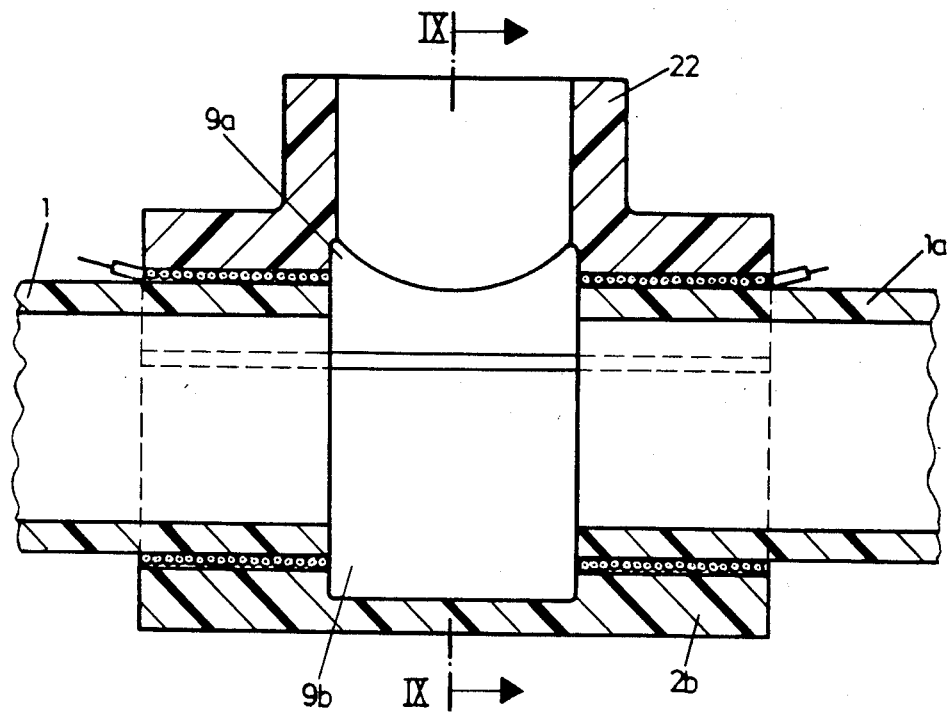
FIG. 8 is a side elevational view in longitudinal section of an apparatus for forming a weld connection with two pipes which are connected with one branch pipe according to a fourth embodiment of the present invention.
Figure 9:
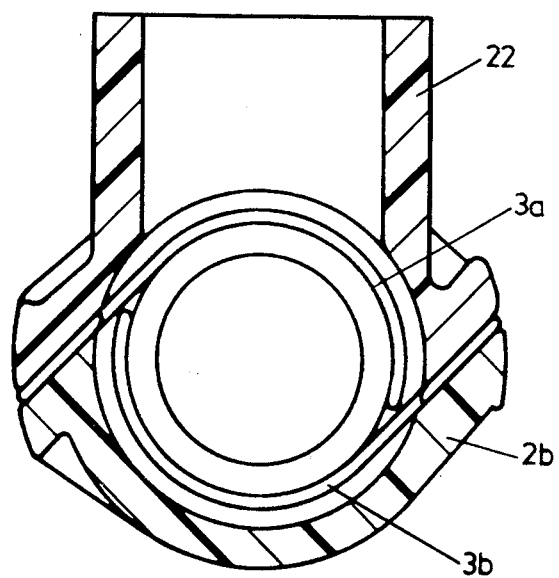
FIG. 9 is a front elevational view in section along line IX—IX of FIG. 8.

FIGS. 8 and 9 show the weld connection formed with a branch piece 22, as is shown in FIGS. 6 and 7, and a molded part 2b coupling two separate pipes 1, 1a. Heating mats 3a, 3b are configured as described before permitting connection of large diameter branch lines.

The weld connection of the present invention is suitable for all weldable thermoplastic materials such as polyethylne, polypropylene, etc. whereby their parts, expect for the resistance wire, should all be produced of the same material.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for forming a weld connection with plastic pipe, comprising
   first and second molded plastic parts, each of said parts having an internal surface corresponding to a peripheral portion of the pipe being welded such that said internal surfaces define a cavity for receiving and enclosing the pipe, said parts being separated by first and second longitudinally extending clearances; and
   first and second heating mats adjacent said internal surfaces of said first and second parts, respectively, each of said mats having one end portion in one of said clearances and comprising a resistance wire coated with plastic, said mats completely covering said internal surfaces and the pipe periphery to be welded.

2. An apparatus according to claim 1 wherein said part internal surfaces are semicylindrical and said clearances extend substantially tangentially therefrom.

3. An apparatus according to claim 1 wherein each of said heating mats is generally U-shaped with two side pieces extending from and connected by a crosspiece, said crosspiece being located in said clearances and said side pieces covering said internal surfaces.

4. An apparatus according to claim 3 wherein each of said internal surfaces comprises two axially spaced bearing surfaces separated by a semicylindrical recess.

5. An apparatus according to claim 4 wherein said recesses in said molded parts and spaces between said side pieces of said heating mats define an annular chamber.

6. An apparatus according to claim 5 wherein said annular chamber receives a packing means for temporarily sealing a leak in the pipe.

7. An apparatus according to claim 6 wherein said packing means includes a clamping means for pressing said packing means onto the pipe.

8. An apparatus according to claim 6 wherein said packing means comprises a band of woven reinforced adhesive tape.

9. An apparatus according to claim 1 wherein said heating mats are secured to said internal surfaces of said molded parts.

10. An apparatus according to claim 1 wherein said internal surfaces comprises means for receiving two pipes from opposite longitudinal ends of said molded parts such that said apparatus functions as a connecting sleeve.

11. An apparatus according to claim 1 wherein said first molded part includes branch means for coupling a branch pipe in fluid communication with the pipe being welded.

12. An apparatus according to claim 1 wherein said first molded part has a transverse bore formed therein.

* * * * *